United States Patent [19]
Kongelka

[11] 3,720,362

[45] March 13, 1973

[54] LOOP SETTING MEANS FOR A MOTION PICTURE PROJECTOR

[76] Inventor: Robert M. Kongelka, 315 Allison Ave., Houston, Pa. 15342

[22] Filed: June 7, 1971

[21] Appl. No.: 150,507

[52] U.S. Cl. ..................... 226/36, 226/44, 226/114, 352/159
[51] Int. Cl. ............................................. B65h 23/16
[58] Field of Search ........... 226/44, 114, 36; 352/159

[56] References Cited

UNITED STATES PATENTS 2,673,486 3/1954 Cunningham ...................... 226/36
3,065,890 11/1962 Fox ..................................... 352/159

Primary Examiner—Richard A. Schacher
Attorney—James P. Malone

[57] ABSTRACT

Automatic loop setting and restoring means to restore the loop in the motion picture film on either side of the film gate. If the loop is lost and the film is pulled tight, a lever is triggered which in turn triggers a gear drive mechanism which rotates the lever to restore the loop.

3 Claims, 3 Drawing Figures

PATENTED MAR 13 1973 3,720,362

INVENTOR.
ROBERT M. KONGELKA

LOOP SETTING MEANS FOR A MOTION PICTURE PROJECTOR

This invention relates to automatic loop forming means for motion picture projectors and, more particularly, to means to restore a loop in the film after it has been lost.

Motion picture projectors require loops on either side of the film gate to accommodate the intermittent film motion occurring at the film gate. If the loops are lost for any reason and the film is pulled taut, it is liable to be damaged.

The present invention provides a simple adapter, generally comprising a lever assembly upon which is mounted a roller. The roller assembly is adapted to be triggerd by the loss of loop. This is accomplished by allowing the "lost" loop to lift the roller supporting lever a pred-determined distance engaging a driving means. With the driving power engaged, the roller and lever reverse their direction of travel and pull the correct amount of film thru the gate resetting the loop.

Accordingly, the principal object of the invention is to provide new and improved loop forming and setting means for motion picture projectors.

Another object of the invention is to provide new and improved loop restoring means to restore a loop after the loop has been lost because of, heavy splices,
worn sprocket holes,
missing holes,
heat damage, or
other discontinuities.

Another object of the invention is to provide in a motion picture film projector of the type having a frame, a film gate, an output film sprocket, a toothed belt connected to drive said sprocket, said film normally having a loop at the output of said film gate, new and improved means to restore a lost loop in said film at the output of said film gate, comprising a lever pivotally mounted on said projector, a roller mounted on the end of said lever, said lever being normally in position inside said loop and out of contact with said film, means to rotate said lever a predetermined amount to form a loop in said film, said lever being connected to trigger said rotation means when said loop is lost and said film comes in contact with said roller.

These and other objects of the invention will be apparent from the following specification and drawings, of which:

Figure 1:
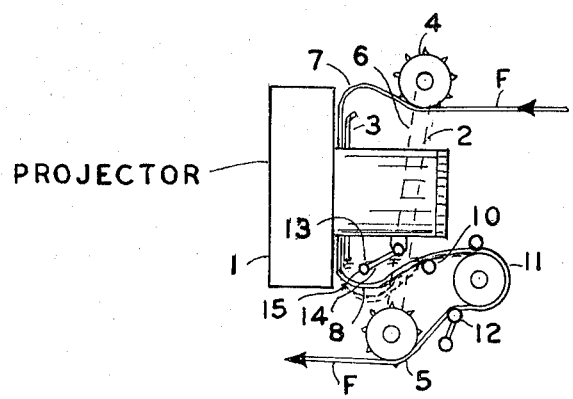
FIG. 1 is a side view of a typical projector.

The FIG. 1 depicts a standard film path with one addition. The addition is pivoted arm 14 carrying a small roller 15. In FIG. 1 the solid line indicates the normal film F path while the dashed section indicates a "lost" loop and alternate dash and dot line indicates where film must be pulled to restore the loop. The roller 15 is normally held above the film, out of contact when film is being handled properly. If film loop is "lost" it no longer clears the small roller 15 and the roller is lifted, triggering a mechanism to be described, which pulls sufficient film through the aperture to restore the loop. This is accomplished by pulling film to a lower path in FIG. 1 with the added roller 15. Note that the motion of the roller is an arc, not a full circle, giving a compact motion suitable for most projection equipment. This motion supplies sufficient "stroke" yet avoids interfering with shutter-aperture housing and automatic threader supports.

Preferably only roller 15 is visible. All other parts are internal. Roller 15 operates thru a slot in the main frame.

Figure 2:
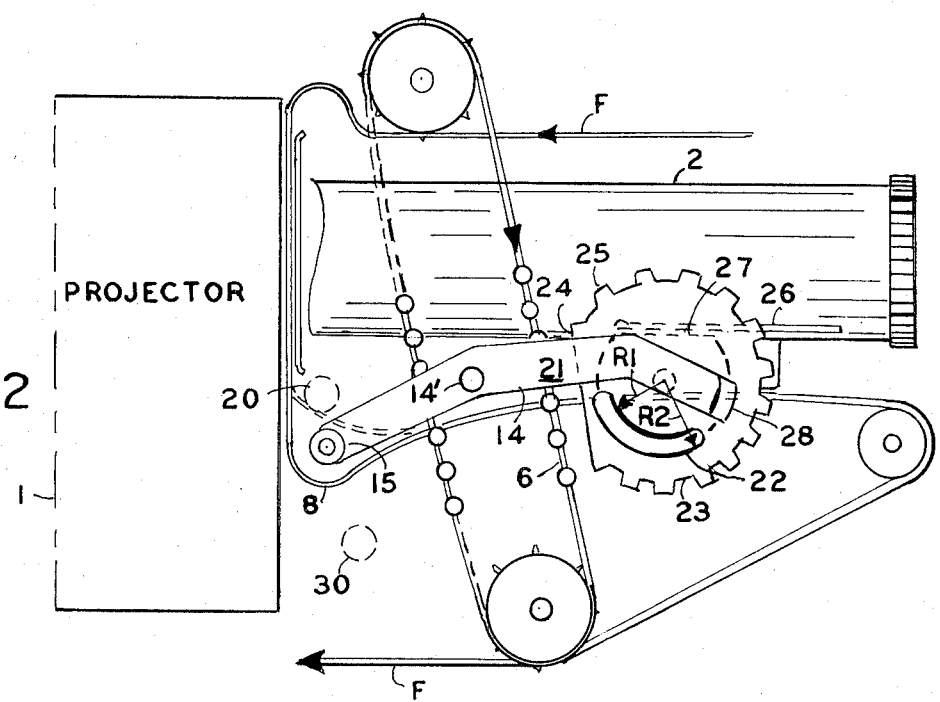
FIG. 2 is a detail view illustrating the drive mechanism for the loop forming lever.

To minimize changes required to install the system into an existing projector, a timing belt, FIG. 2, having teeth on both sides of its pitch line is substituted for the existing sprocket drive timing belt. The back of the substitute belt supplies the power for the mechanism that drives the arm 14 and roller 15 added to the machine. Mounted on a center close enough to the belt so as to be in mesh with the outside teeth on the "dual tooth" belt is a timing pulley alternatively we could use smooth pulley with a flat and flat belt with sufficient tension and flanges. The size of this pulley has a direct effect on "restorer" action. A 24 tooth pulley gives sufficient driving torque and a slow, gentle action with the geometry used, for instance, in the Viewlex "Super 1600." The pulley or gear being described has two flat areas of importance: (1) a flat region 24 on its circumference that has teeth removed allowing a position where the belt cannot drive the pulley. (2) a flat on a cam 27 surface attached to the pulley that assures the pulley always stops out of belt engagement. The cam surface and hence the pulley is positioned by a light spring riding on it.

Referring, more specifically, to FIG. 1, there is shown a typical motion picture projector 1 having a lens housing 2 and a film gate 3. The film F is driven by the input sprocket 4 and the output sprocket 5. The sprockets are driven by a toothed belt 6. Loops 7 and 8 are necessary to provide for the intermittent motion of the film within the film gate. When the film exits from the gate at the bottom of the projector, it passes around guide rollers 10, 12, to the output sprocket 5. Roller 11 is typically a stabilizing roller attached to the fly wheel. Referring to the lower loop 8, if it is lost due to some film discontinuity or for some other reason, then the film will assume the position shown by the dotted lines 13. The film in this position is already damaged to some extent for it to have difficulty going thru machine smoothly. At this point film is in continuous motion causing a smear of moving frames on the screen. The auto setter eliminates stopping the presentation to reset film. In order to restore the loop, a lever 14 is provided upon which is mounted a roller 15. A drive mechanism is provided, as shown in FIG. 2 for driving the lever. In order to form a proper loop, as shown in the full line, it is necessary to make a loop as shown in the dash-dot lines.

Referring to FIGS. 1 and 2, lever 14 is pivotally mounted at 14' on the lens casing 2. The roller 15 normally fits inside the loop 8 and out of contact with the film. If the lower film path is shortened as shown by the dotted lines, then the film raises the lever 14 and roller 15 to the point 20. When this happens, portion 21 of the lever bears against the raised arcuate portion 22 of the gear 23 which has frictional engagement with lever 14. Gear 23 is a mutilated gear having a flat side 24 and a plurality of teeth which are adapted to engage the teeth on the drive belt 6. When the lever 14 and roller 15 are triggered to the position 20 by the film when the loop is lost, then the portion 21 of the lever presses down on the raised projection 22 and rotates the gear 23 counter-clockwise sufficiently so that the gear teeth 25 engage the teeth on the belt 6. The belt 6 will then rotate the gear 23 counterclockwise in FIG. 2 until the teeth become disengaged from the belt when the flat portion 24 rotates into the position shown in FIG. 2. This position is indexed by the flat spring 26 bearing on the flat portion of the cam 27, which is mounted on the gear 23. This counterclockwise motion of gear or pulley 23 is transmitted by the raised arcuate portion 22 of lever 14 rotating it and moving roller to position 30, thereby restoring the loop. After the gear teeth become disengaged from the belt, then the weight 28 on the end of the lever 14 causes the lever to rotate clockwise in FIG. 2 and raises the roller 20 out of contact with the film F to the normal running position shown in FIG. 2.

FIG. 2 is probably a more simple arrangement.

FIG. 1 gives the additional feature of roller 15 being out of the way when threading manually.

Figure 3:
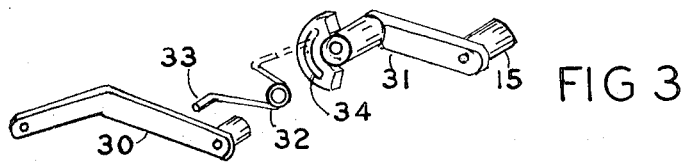
FIG. 3 is a perspective view of a modification of the invention.

FIG. 3 shows a perspective view of a modified lever.

To this point the lever in FIG. 2 has been considered rigid. In practice, it preferably has spring compliance. This accomplishes two important functions; (1) eliminates need for retraction of claw teeth, since spring 32 "winds" while film is intermittently held by the claw teeth. (2) eliminates a mechanical interlock with a threader not shown. This protects both the threader and operator should the roller be set off with threader in position, for instance, if a small child would start it with a finger. Notice also that this is a good place for tolerance take-up. Either the slot in the main frame or a suitable stop on gate bottom can limit roller full down travel while a surplus can be built-in from cam on timing pulley with excess travel being stored in spring.

In FIG. 3, the lever modification comprises two separate pieces 30, 31, which are connected together by means of the spring 32. When assembled, pin 33 on lever 30 is loaded against bottom of slot 34 in piece 31 by spring 32.

OPERATION

A. When loop is lost film lifts roller; this causes other end of roller lever to nudge timing pulley into engagement (R1 gives large angular displacement to mutilated gear or pulley from a small input).

B. Pulley engages belt and turns once. The radius R2 gives lever sufficient stroke to set loop.

The lever in FIG. 2 is weighted on its left side to keep the roller up in position. A spring could be used. The arcuate projection on pulley side, (shaded curved area), and the lever end is shaped such that a dwell and gradual return of film roller result. FIG. 2 shows a construction with all parts preferably hidden internally. This design is adaptable to a situation where the right side of the lever in FIG. 2 could be attached to the bottom of lens gate utilizing a quick-connect link (as in FIG. 1). This would facilitate manual threading since roller would now swing out of way with lens gate, rather than have a semi-fixed roller operating through a slot in the main-frame.

The arcuate projection 22 is preferably not a true arc, but has two radii R1 and R2 connected by a smooth curve that when operated against lever shape allows roller to dwell at bottom of stroke. This gives sufficient time for roller to complete stroke in event of spring wind-up.

I claim:

1. In a motion picture film projector of the type having a frame, a film gate, an output film sprocket, a toothed belt connected to drive said sprocket, said film normally having a loop at the output of said film gate, means to restore a lost loop in said film at the output of said film gate, comprising:

a lever pivotally mounted on said projector, a roller mounted on the end of said lever, said lever being normally in position inside said loop and out of contact with said film, means to rotate said lever a predetermined amount to form a loop in said film, said lever being connected to trigger said rotation means when said loop is lost and said film comes in contact with said roller, wherein said means to rotate comprises a mutilated gear having a flat portion, an arcuate projection mounted on one side of said gear, said gear being adapted to engage said sprocket drive belt when said rotation means is triggered, said lever being adapted to trigger said gear when said lever is triggered by a lost loop whereby said gear is rotated a predetermined amount in an arc shaped motion by said drive belt and said arcuate projection engages said lever and moves said lever a predetermined amount to form a loop of predetermined size in said film.

2. Apparatus as in claim 1 having a detent to position said gear.

3. Apparatus as in claim 1 having swing away roller means.

* * * * *